United States Patent [19]
Janky

[11] Patent Number: 6,014,375
[45] Date of Patent: Jan. 11, 2000

[54] TDMA RADIO PROTOCOL WITH ADAPTIVE VOCODER SELECTION

[75] Inventor: William O. Janky, Goode, Va.

[73] Assignee: Ericsson Inc., Research Triangle Park, N.C.

[21] Appl. No.: 08/800,024

[22] Filed: Feb. 13, 1997

[51] Int. Cl.$^7$ .................................................. H04J 4/00
[52] U.S. Cl. ........................ 370/347; 370/330; 370/437
[58] Field of Search ................................... 370/319, 321, 370/330, 337, 236, 340, 341, 344, 347, 436, 437, 442, 465, 467, 496, 522, 523, 468; 375/222

[56] References Cited

U.S. PATENT DOCUMENTS

| | | | |
|---|---|---|---|
| 5,414,796 | 5/1995 | Jacob et al. | 704/221 |
| 5,528,579 | 6/1996 | Wadman et al. | 370/522 |
| 5,537,410 | 7/1996 | Li | 370/465 |
| 5,574,788 | 11/1996 | Childress et al. | 455/17 |
| 5,729,226 | 3/1998 | Betts et al. | 370/522 |
| 5,790,527 | 8/1998 | Janky et al. | 370/330 |
| 5,822,314 | 10/1998 | Chater-Lea | 370/337 |

FOREIGN PATENT DOCUMENTS

| | | |
|---|---|---|
| 0 615 353 A1 | 9/1994 | European Pat. Off. . |
| 0 644 702 A1 | 3/1995 | European Pat. Off. . |
| 2 301 734 | 12/1996 | United Kingdom . |
| WO96/19906 | 6/1996 | WIPO . |

*Primary Examiner*—Chi H. Pham
*Assistant Examiner*—Frank Duong
*Attorney, Agent, or Firm*—Nixon & Vanderhye P.C.

[57] ABSTRACT

A new air interface protocol compliant with narrowband (12.5 kHz) channels being mandated for use in North America provides a narrowband (i.e., 18 kbps–19.2 kbps), two-slot scaled version of the European TETRA time division signaling that can accommodate different vocoder frame formats. Any vocoder having a frame size that is a submultiple of a certain frame rate can be used. The new air interface is fully compatible with prior frequency division signaling control channels. Adaptive vocoder selection can allow a radio to dynamically select between different vocoding standards and indicate its selection through over-the-air signaling.

44 Claims, 10 Drawing Sheets

FIG. 1  *EXAMPLE WORKING CHANNEL SIGNALING*

FIG. 1A

FIG. 2 *CONTROL CHANNEL/WORKING CHANNNEL SYNCHRONIZATION TIMING DIAGRAM*

FIG. 3A (PRIOR ART)

SLOT STRUCTURES FOR PROPOSED AIR INTERFACE PROTOCOLS

FIG. 4A *EXAMPLE RADIO*

FIG. 5A
*EXAMPLE TRANSMITTING STEPS*

FIG. 5B  *EXAMPLE RECEIVING STEPS*

TDMA RADIO PROTOCOL WITH ADAPTIVE VOCODER SELECTION

CROSS-REFERENCE TO RELATED APPLICATIONS

This application is related to commonly assigned U.S. patent application Ser. No. 08/359,691 of Janky et al. filed Dec. 20, 1994, entitled "A Trunked Radio Frequency Communication System for Accommodating Both Frequency and Time Division Based RF Communications" (Attorney Ref. No. 46–797; Ericsson Ref. No. LM6297-DLMR), now U.S. Pat. No. 5,790,527. The entire disclosure of that patent specification (including the drawings) is incorporated by reference into this specification.

FIELD OF THE INVENTION

The invention relates to radio frequency (RF) communications systems, and more particularly to RF communications systems using time division multiple access (TDMA) signaling protocols. Still more particularly, the present invention relates to adapting the European TETRA communications standard for use with different time division signaling rates, vocoded speech signaling formats, and/or a frequency division control channel.

BACKGROUND OF THE INVENTION

Radio systems are very important to our society. Police and law enforcement officers use mobile and portable two-way radios every day to stay in touch with dispatchers and with one another. Fire fighters find out about fires and receive calls for help over land mobile radios. Paramedics and ambulance drivers communicate with doctors and hospitals via radio communications. Our security and safety depends on these radio communications systems being reliable and cost-effective.

Some of the most challenging problems facing radio designers today relate to issues of "compatibility." Generally speaking, a radio is "compatible" with a radio system if the radio can successfully work with the system. Obviously, it would be a bad idea to give a police officer a radio that is not compatible with the police department's radio system, since this would cut off communications between the police officer and the rest of the police department.

Different countries of the world have developed different standards specifying how radios should communicate with one another. For example, the European Telecommunications Standardisation Institute (ETSI) has developed an open standard called "TETRA" that defines a radio air interface for European mobile radio users. See ETS 300 392-2 ed.1 (1996-03) entitled "Terrestrial Trunked Radio (TETRA): Voice plus Data (V+D); Part 2;Air Interface (AI). The TETRA air interface provides a four-slot, high speed digital data rate (36 kbps) time division protocol based on a certain European radio channel bandwidth (25 kHz). In contrast, the North American land mobile radio market is moving toward narrow band signaling. Many North American radio channels are only half as wide as the European channels (i.e., 12.5 kHz as compared to 25 kHz). Radios transmitting at the higher, European data rate will not work with systems designed for the narrowband North American standards because they will exceed the maximum bandwidth for a narrowband channel.

Additionally, ETSI's TETRA standard specifies the use of a speech vocoder compliant with certain European vocoding standards. Basically, a vocoder ("voice coder") is a device that converts speech signals into compact digital signaling for transmission. Vocoder standards developed by the French company Thomson-CSF Communications Corp. have achieved wide acceptance in the European radio market. In contrast, the North American land mobile radio market has standardized on a different vocoder standard called "Improved Multi-Band Excitation" ("IMBE"). See APCO Project 25 Vocoder Description (Standard No. IS-102.BABA, Telecommunications Industry Association). The Thomson vocoder standards are based on a certain vocoder frame duration (i.e., 30 ms), whereas the North American IMBE standard is based on a different vocoder speech frame duration (20 ms).

For many years, mobile radio users in North America and elsewhere have achieved great success with Ericsson's Enhanced Digital Access Communication System ("EDACS"). The EDACS system provides frequency division type signaling on control and working channels. Existing land mobile radio customers such as those using Ericsson's EDACS system may wish to migrate to the benefits of time division signaling—but may want to use signaling that is similar to the European TETRA standard while using a different vocoder technology, such as IMBE and/or a different data transmission rate suitable for use with North American narrow band channels.

SUMMARY OF THE INVENTION

The present invention provides a new air interface that can accommodate different protocol parameters such as different transmission rates and different speech vocoder types while providing compatibility with existing radio systems such as EDACS.

Briefly, the present invention provides a new air interface protocol compliant with narrowband (12.5 kHz) channels being mandated for use in North America. The new air interface provides, for working channel operation, a scaled, narrow band (i.e., 18 kbps–19.2 kbps data rate, 12.5 kHz bandwidth), two-slot version of the European TETRA time division signaling protocol. This new protocol can accommodate different vocoder frame formats such as the IMBE formats commonly used in North America. The preferred embodiment air interface protocol is very flexible; any vocoder based on a 20 ms, 30 ms, or 60 ms speech frame can be used—and the protocol can therefore accommodate both Thomson and IMBE vocoder frame formats. Moreover, the new air interface protocol provided by the preferred embodiment is fully compatible with Ericsson's EDACS signaling—allowing the two-slot scaled version of a TETRA TDMA working channel to be used in conjunction with an EDACS frequency division control channel.

Control Channel Alignment

The new air interface protocol provided in accordance with the preferred embodiment of this invention allows synchronization with frequency division type control channel signaling. For example, the working channel signaling provided in the preferred embodiment of this invention can be used with existing EDACS trunked frequency division systems. Current time division systems such as ETSI's TETRA and Ericsson's EDACS Prism TDMA systems rely on the synchronization between the control channel and the working channel. In the particular arrangement described in the above-referenced Janky et al. patent application, for example, the EDACS control channel uses 30 ms frames and a TDMA working channel uses 40 ms frames (the 40 ms frame for EDACS Prism is based on the IMBE vocoder which uses a 20 ms speech frame). The system in the Janky et al disclosure was designed to align these frames every 120 ms in order to help improve call set up time and reliability.

The new interface protocol provided in accordance with the preferred embodiment of this invention also uses a time division working channel frame structure and an EDACS frequency division control channel, but the periodic alignment of control and working channels is achieved at a different periodic time interval—i.e., once every 510 ms (the corresponding TETRA protocol is based on a 30 msec vocoder frame, but uses a 17/18 compression on the transmitted data to free up every 18th frame for control signaling). Migration of an existing EDACS system to use the new time division working channel protocol is greatly facilitated by the use of the existing EDACS control channel. Requiring a change to a TDMA-based control channel would preclude the upgrade of an existing customer to TDMA until that customer was ready to do a total system replacement.

The New Protocol Accommodates Different Vocoders

As mentioned above, the European TETRA protocol frame rate and structure is based on using a Thomson vocoder and a 30 ms speech frame. The Thomson vocoder uses 7.2 kbps of voice coding and a kind of error correction called forward error correction ("FEC"). The IMBE vocoder standardized in North America also uses 7.2 kbps of voice coding and FEC, while Ericsson's EDACS version of IMBE has been optimized to use 7.1 kbps voice coding. Given that three 20-ms IMBE vocoder frames have the same duration as two 30-ms Thomson vocoder frames, the scaled TETRA working channel frame structure can be used to accommodate either vocoder. For example, it is possible to substitute 1-½ IMBE speech frames for each Thomson speech frame. In addition, it is possible to use spare bits to "pad" 7.1 kbps IMBE speech frames so they have the same number of bits as 7.2 kbps speech frames.

In the air interface protocol provided in accordance with this invention, the 432 bits available in the 56.67 ms narrowband scaled TETRA frame can be allocated in two 216-bit groups. Each 216-bit group corresponds to one Thomson vocoder frame, 1.5 IMBE frames at 7.2 kbps, or 1.5 IMBE frames at 7.1 kbps with 3 spare bits. Any vocoder that is compatible with a certain frame rate (e.g., 20 ms, 30 ms or 60 ms) can be used in the preferred embodiment. Moreover, a common signaling arrangement can be made compatible with a scaled TETRA two-slot, 18 kbps TDMA protocol using the Thomson vocoder, an IMBE vocoder at 7.2 kbps, and/or an IMBE vocoder at 7.1 kbps. Just as in the TETRA standard, these available 432 bits can be associated with data instead of vocoded voice to provide data transmissions.

Adaptive Vocoder Selection

This invention also provides an adaptive vocoder selection feature. A transmitting radio can send, as part of its working channel time division signaling, a code that specifies which vocoder it is using. For example, in the TETRA protocol, 34 bits are set aside for power amplifier (PA) ramping on the up link. At 36 kbps, these bits last 944 ms. When the TETRA protocol is scaled to provide a two-slot 12.5 kHz protocol, the data rate is only 18 kbps—and these 34 bits thus would take twice as long (~1.89 ms) to transmit. All 34 bits are not needed for power control. Some extra time is required for settling for a radio synthesizer based on 12.5 kHz channel spacing. However, 4 bit times can be used for vocoder selection.

The transmitting radio can transmit an adaptive vocoder selection code on the up link during these bit times. System components (e.g., receivers) can dynamically select between different vocoder techniques based on these bits. On the down link, the vocoder selection can be communicated to all receiving radios through the "SACCH" (slow associated control channel) bits available as part of the scaled TETRA down link slot structure. In the preferred embodiment protocol, these SACCH bits are grouped together and moved to the beginning of the slot structure to provide settling time required for full duplex communication in a two-slot TDMA protocol.

BRIEF DESCRIPTION OF THE DRAWINGS

These and other features and advantages provided in accordance with this invention may be better and more completely understood by referring to the following detailed description of presently preferred example embodiments in conjunction with the drawings, of which.

DETAILED DESCRIPTION OF EXAMPLE EMBODIMENTS

Figure 1:
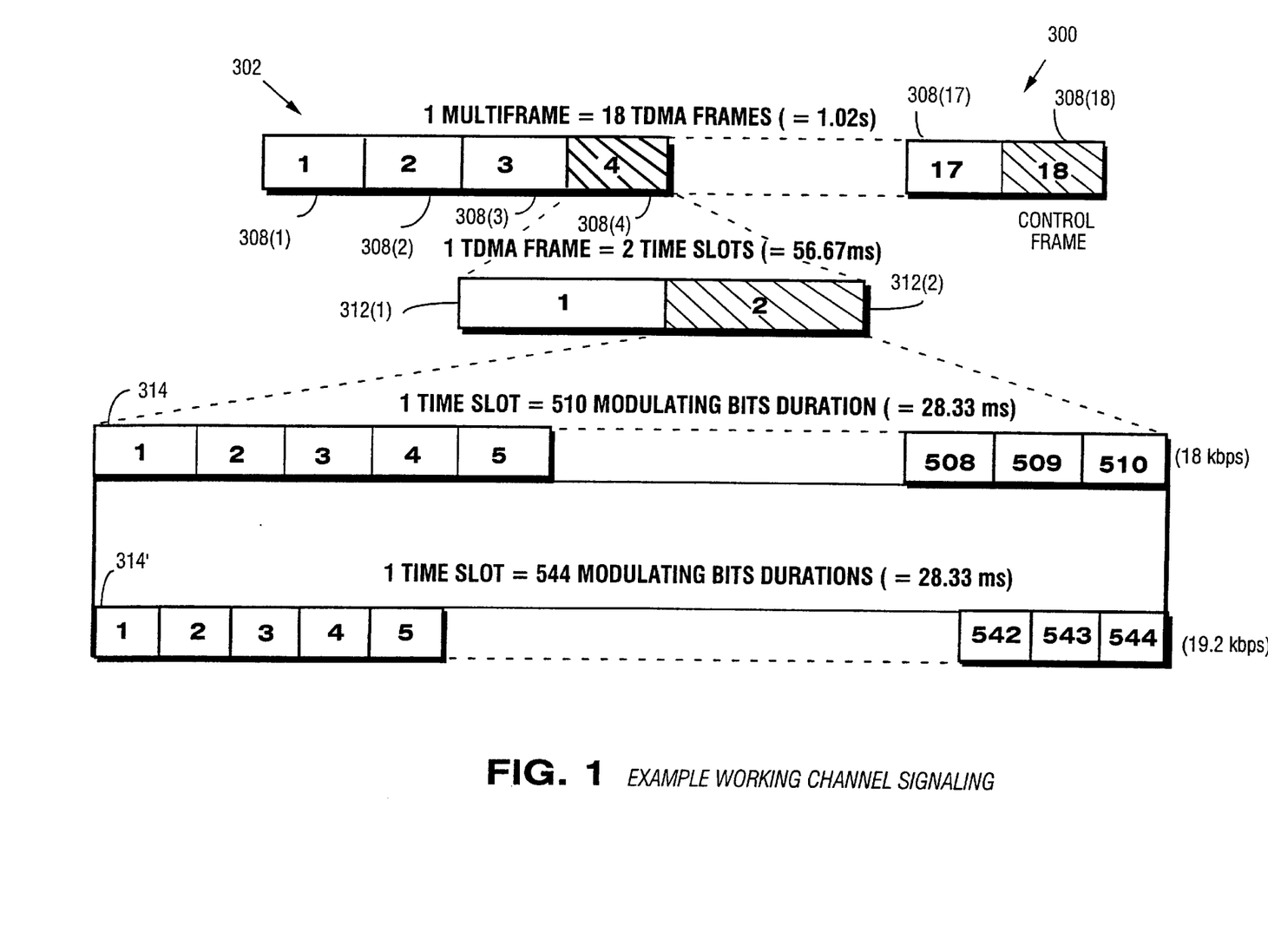
FIG. 1 shows an example time division working channel signaling.

FIG. 1 shows a preferred example narrowband working channel air interface protocol 300 provided in accordance with this invention. In this example, the working channel protocol 300 includes a sequence of "multi frames" 302 each comprising 18 time division frames 308 (in this example, the 18th frame 308(18) is used as a control frame). The multi frame 310 has a total duration in this example of 1.02 seconds, so that each time division frame 308 has a duration of 56.67 ms.

Figure 1A:
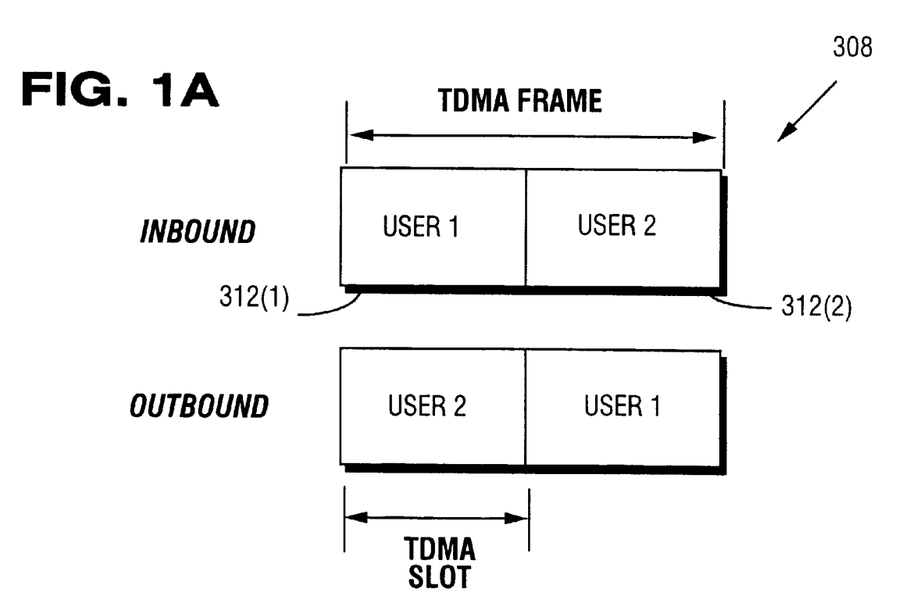
FIG. 1A shows example time division slot usage.

Each time division frame 308, in turn, comprises a pair of TDMA slots 312(1), 312(2). Each slot 312 has a duration of 28.33 ms. Each time slot may contain synchronization signals and data signals. The data signals may include the actual content of the message/call including digitized vocoded speech and/or data from a facsimile, a mobile data terminal, a personal computer, etc. These two slots 312(1), 312(2) can be assigned to different radio users to provide time division communications (see FIG. 1A).

Each time division slot 312 comprises a number of modulating bits. The number of bits comprising each slot 312 depends on the rate at which the preferred protocol is transmitted. To ensure that the bandwidth of a 12.5 kHz channel is not exceeded, the data rate can be 18 kbps and should be no more than about 19.2 kbps. If the protocol 304 is transmitted at exactly 18 kbps, then each slot will comprise 510 modulating bits 314. On the other hand, if the preferred protocol 304 is transmitted at a slightly higher rate of 19.2 kbps, then each slot 312 will comprise 544 modulating bits 314'. To minimize additional complexity, the 18 kbps and 19.2 kbps bit formats can be identical—with the additional 34 bits (i.e., bits 511–544) available in the 19.2 kbps format being used to "pad" the end of the slot for increased radio synthesizer settling time.

Preferred Synchronization Between Control Channel and Working Channels

Figure 2:
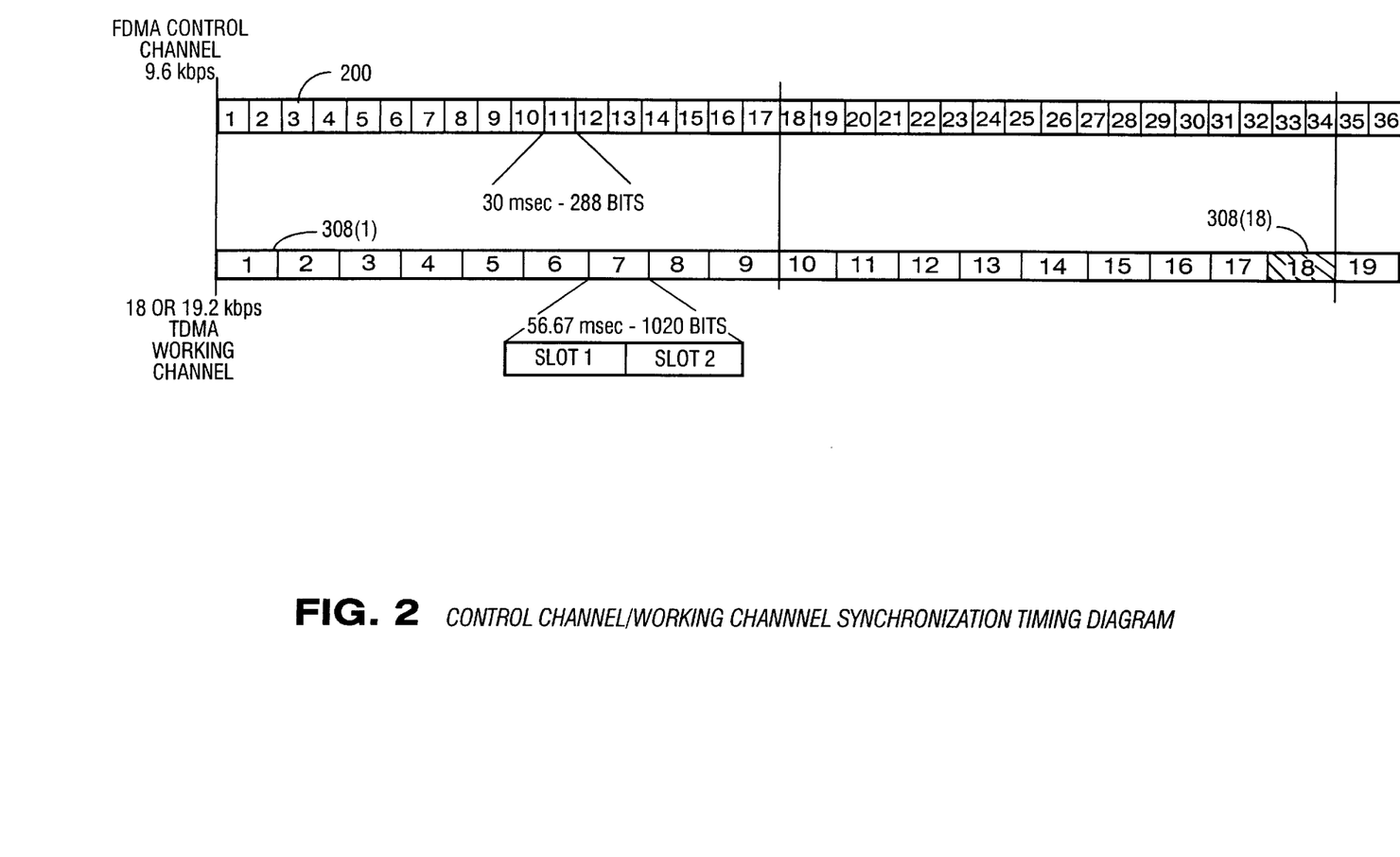
FIG. 2 shows example synchronization between an frequency division control channel and a time division working channel.

FIG. 2 illustrates a preferred synchronized relationship between a 9.6 kbps EDACS frequency division control channel (top) and the example time division working channel (bottom). Briefly, the frequency division control channel frames 200 are synchronized with the time division working channel frames 308 so that they regularly and periodically align without requiring alignment between each and every frame. In the example shown, the beginning/end of every nth control channel frame 200 (as signified, for example, by sync bits within the frame) will align with the beginning/end of every kth working channel frame 308. In this particular example, since the control channel frames are each 30 msec long and the working channel frames are each 56.67 msecs long, every 17th frequency division control channel frame 200 aligns with every 9th time division working channel frame 308 (i.e., k=9, n=17). This synchronized relationship permits radios to quickly obtain synchronization to an assigned TDMA digital working channel, i.e. frequency and time slot, using the alignment of sync fields between the FDMA frame and a TDMA time slot.

Detailed Slot Structures

FIGS. 3A–3E show example detailed time division slot structures. Each of these diagrams comprises a pair of slot structures with the top structure in the pair being the "uplink" (from radio to repeater) structure, and the bottom structure in the pair being the "downlink" (from repeater to radio) slot structure.

Figure 3A:
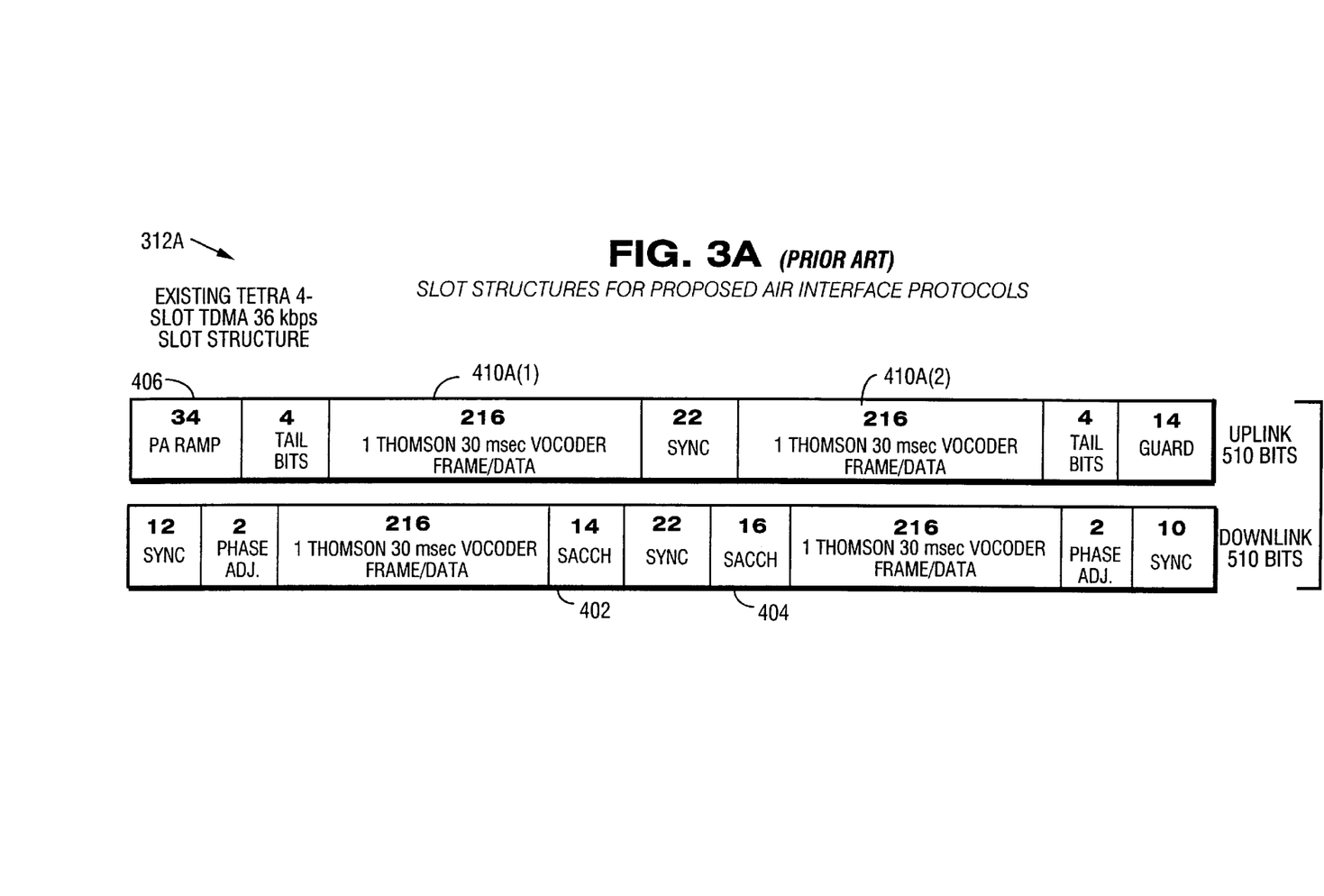
FIGS. 3A–3E show example time division slot formats.

FIG. 3A shows a prior art standard TETRA wideband (25 kHz) four-slot time division 36 kbps format carrying Thomson vocoder 30 msec speech frames 410A.

Figure 3B:
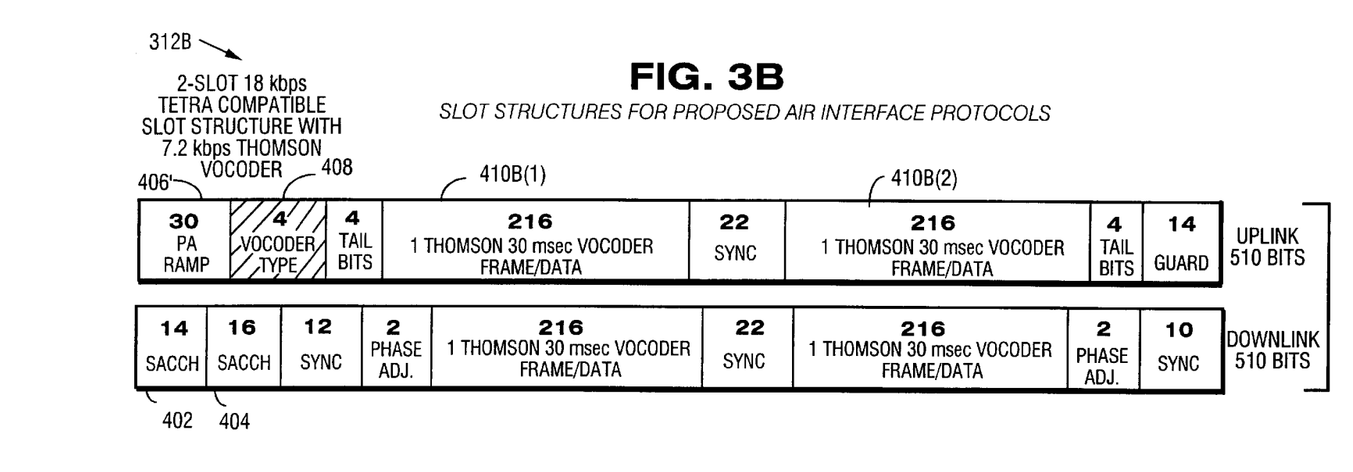

FIG. 3B shows a two-slot version of the FIG. 3A TETRA time division slot structure that has been scaled for transmission over a narrowband (12.5 kHz) channel at a 18 kbps data rate. Most of the FIG. 3B slot fields correspond closely or exactly to the FIG. 3A TETRA slot fields. The 14-bit and 16-bit SACCH fields 402, 404 of the FIG. 3A downlink slot structure have been moved to before the initial 12-bit sync field in FIG. 3B to provide settling time for two-slot TDMA, 12.5 kHz channels. In addition, in the FIG. 3B slot structure, 4 bits of the uplink "ramp" power control field 406' are used to encode "vocoder type" information 408 for dynamic vocoder selection. Note that the FIG. 3A protocol sets aside 34 bits 406 for power amplifier (PA) ramping on the up link. If the FIG. 3A up link protocol is transmitted at 36 kbps, the duration of these 34 bits is 944 ms. Using a slower, 18 kbps data rate (FIG. 3B), transmitting 34 bits will take twice that amount of time (i.e., 1.89 ms). Some of this extra time must be allowed for settling for a synthesizer based on 12.5 kHz channel spacing. However, four bits may be used for another function—vocoder selection.

In this FIG. 3B example (as well as in the FIG. 3C, 3D and 3E examples discussed below), a transmitting radio may transmit, on the up link within each TDMA slot, four bits of vocoder type information 408 specifying the type of vocoder to use. In the case of the FIG. 3B example, the 4-bit "vocoder type" field may be encoded with a distinctive bit pattern signifying that it contains Thomson 30 msec vocoded speech frames 410B. The repeater may recognize this information and repeat it on the down link to receiving radios in the form of SACCH information 402 and/or 404. Thus, multi mode radios capable of using different kinds of vocoders (e.g., Thomson, 7.1 kbps IMBE and 7.2 kbps IMBE) may be used. Different vocoding standards could be used depending on particular radio group IDs. A receiver receiving a signal could select between vocoder processes depending on the SACCH 402, 404 information contents. In this way, on the up link, the vocoder selection is adaptive—and on the down link, vocoder selection can be communicated through SACCH bits available in the proposed down link slot structure.

Figure 3C:
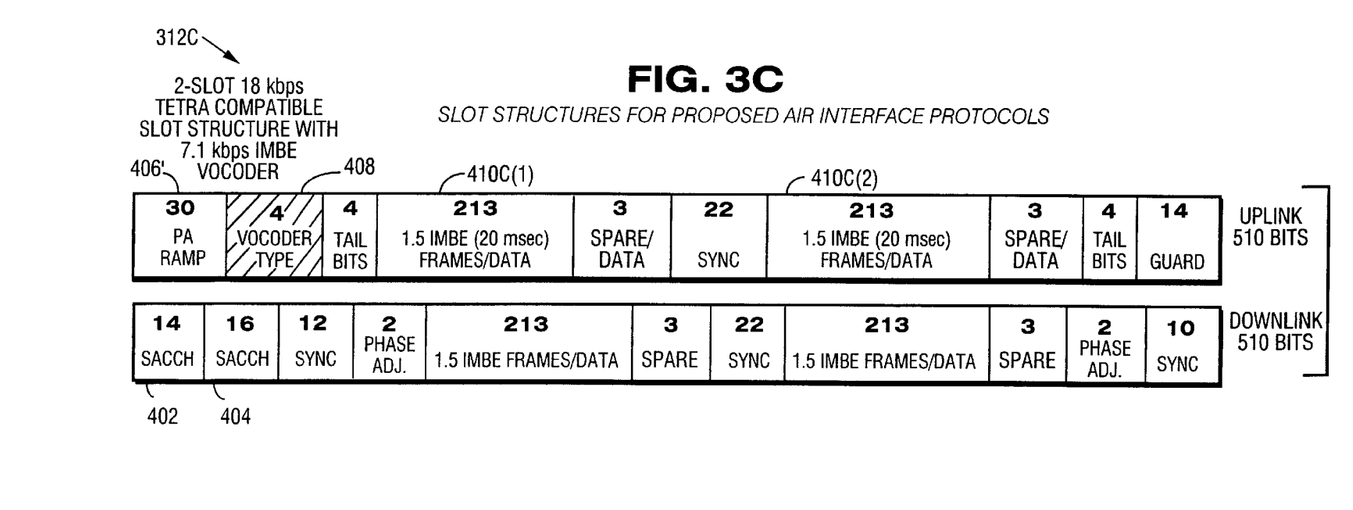

FIG. 3C shows an example narrowband (12.5 kHz) scaled two-slot version of the TETRA time division structure 312C carrying IMBE vocoded speech frames 410C instead of Thomson vocoded speech. The "vocoder type" field 408 in the FIG. 3C uplink slot structure would be encoded with a distinctive bit pattern indicating that the slot contains 7.1 kbps IMBE vocoded speech frames 410C. The IMBE speech frames are 20 msecs in duration as compared to the Thomson 30 msec vocoded speech frames, so 1.5 IMBE frames can be placed into the bits that the FIG. 3A TETRA protocol uses for a single Thomson frame (in this example, three "spare" (or data) bits are appended to each 213-bit-long sequence of one-and-a-half 7.1 kbps IMBE vocoded speech frame to provided exactly 216 bits—the same number of bits as in the FIG. 3A Thomson 30 msec vocoder frame 410A.

Figure 3D:
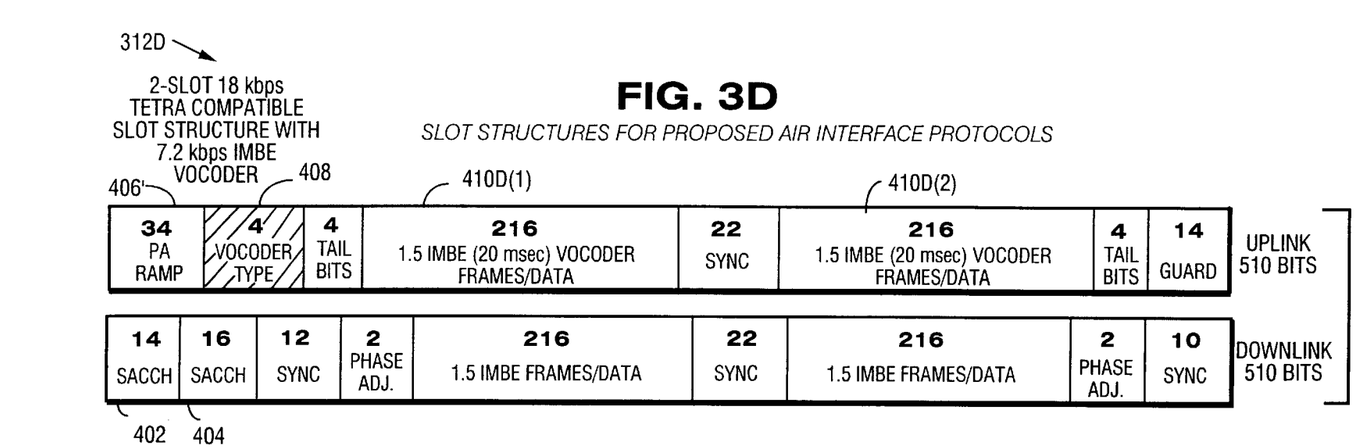

FIG. 3D shows an example narrow band (12.5 kHz) scaled 18 kbps two-slot version of the TETRA time division structure carrying 7.2 kbps IMBE vocoded 20 ms duration speech frames 410D. In this example, one-and-a-half IMBE speech frames comprises 216 bits—the same as a full 30 msec Thomson vocoder frame. In this FIG. 3D example, the uplink slot structure "vocoder type" field 408 may provide a distinctive bit pattern indicating that the slot structure contains 7.2 kbps IMBE vocoded speech frames.

Figure 3E:
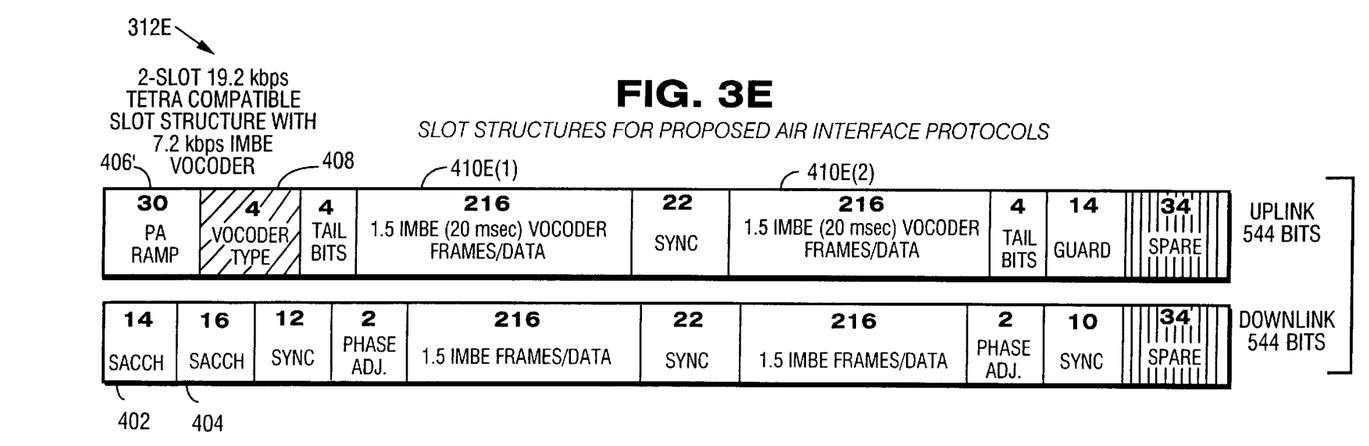

FIG. 3E shows an example of how the FIG. 3D slot structure can be scaled for 19 kbps transmission. In this example, the first 510 bits of the FIG. 3E slot structures are identical to the 510 bits of the FIG. 3D slot structures. Thirty-four "settling bits" are appended at the end of each 19.2 kbps TDMA slot in FIG. 3E to give the receiving radio synthesizer additional time to settle.

Example System Operation

Figure 4:
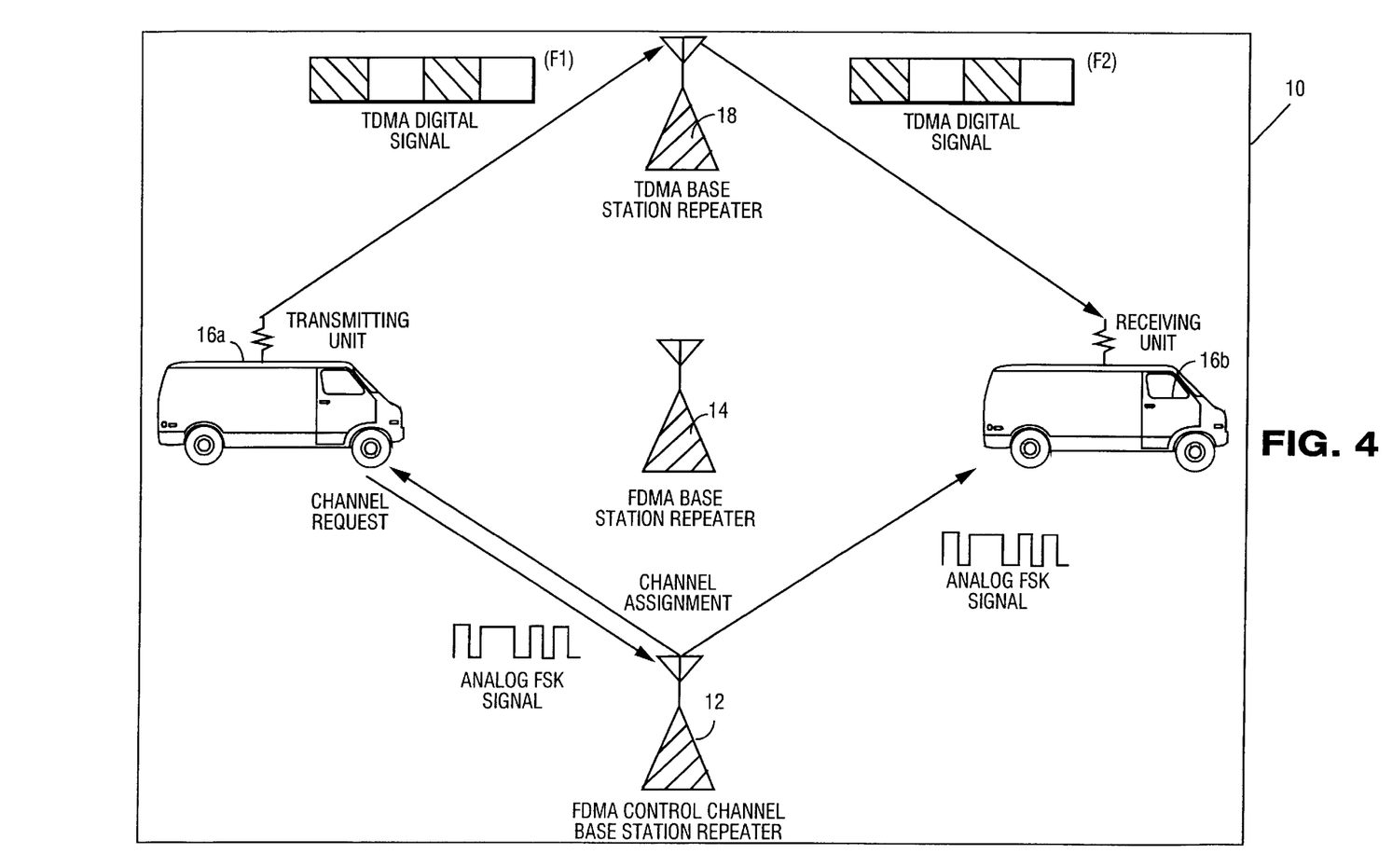
FIG. 4 shows an example overall radio system capable of using a frequency division air interface protocol such as EDACS or a scaled, narrow band, two-slot version of the TETRA time division air interface protocol with adaptive vocoder selection.

FIG. 4 shows an example trunked RF communications system 10 that provides frequency division based (FDMA) radio communications, and also provides time division based (TDMA) radio communications using some or all of the TDMA slot structures shown in FIGS. 3B–3E. System 10 can provide at least one time division based air interface protocol (FIGS. 1–3E) in addition to at least one frequency division based air interface protocol (e.g., the EDACS working channel protocol).

Figure 4A:
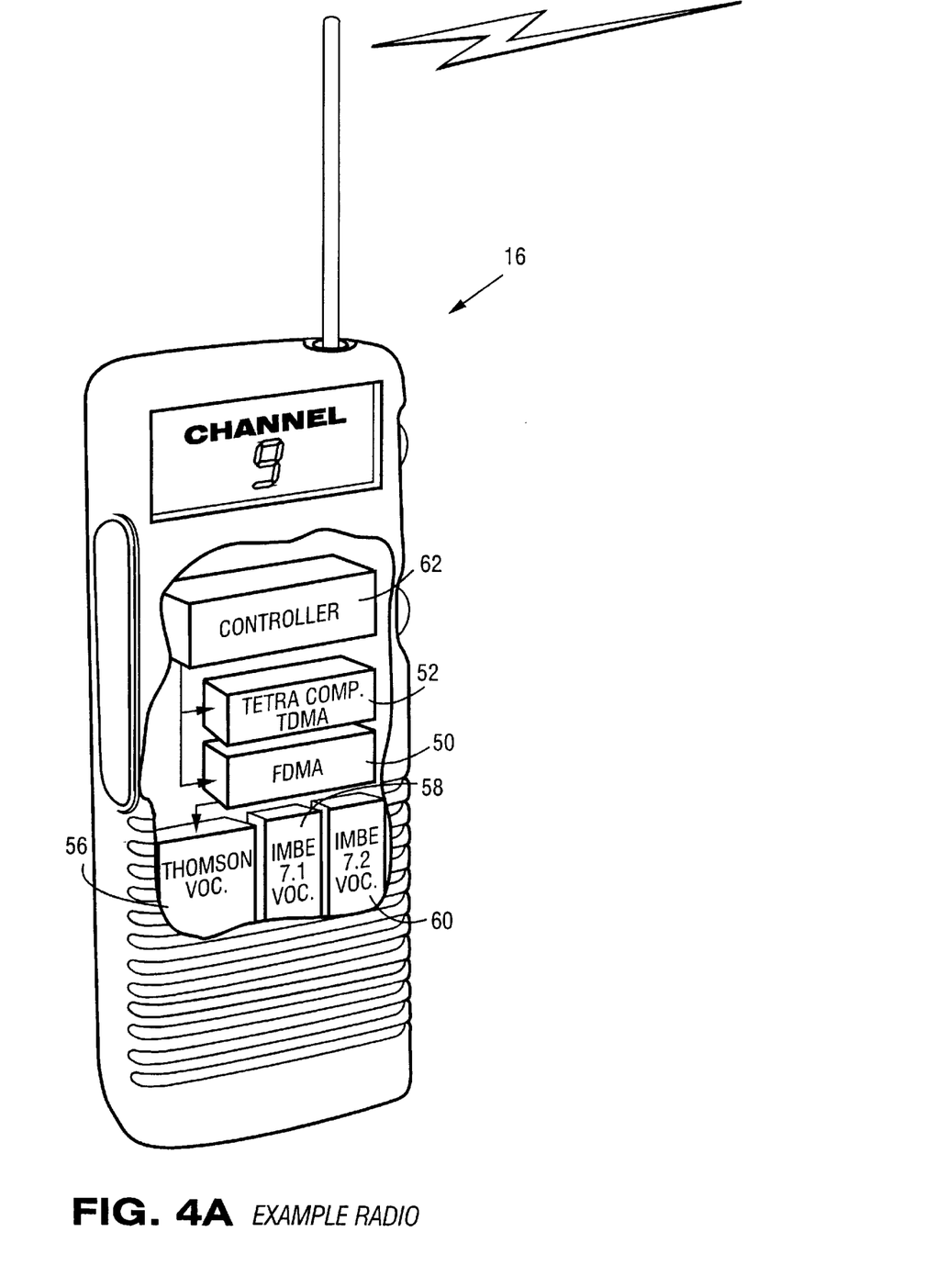
FIG. 4A shows an example multimode radio.

Example mobile radio unit 16a can operate in either a frequency division mode or in a time division mode. FIG. 4A schematically shows an example of a radio 16 that can switch between different modes. This example radio 16 includes frequency division circuitry 50, time division circuitry 52, a Thomson type vocoder 56, an IMBE 7.1 kbps vocoder 58, an IMBE 7.2 kbps vocoder 60, and a controller 62. People skilled in the art will understand that blocks 50–60 may be provided by different software-controlled algorithms and/or different electrical circuits. Controller 62 can select either of frequency division circuitry 50 and time division circuitry 54 for use in transmitting working channel radio signals over the air. Controller 62 can also select any of Thomson type vocoder 56, IMBE 7.1 kbps vocoder 58, and IMBE 7.2 kbps vocoder 60 for use in vocoding speech signals to send over the air.

Radio 16 can use the frequency division control channel to request either a time division working channel or a frequency division working channel. In response to frequency division control channel signaling from radio 16a, control channel repeater 12 (see FIG. 4) assigns either a frequency division base station repeater 14 or a time division base station repeater 18 based on the nature of the call request. Repeater 18 is installed to be capable of transmitting and receiving a two-slot 12.5 kHz scaled version of TETRA signalling.

Referring once again to FIG. 4, if at least one of calling radio 16*a* and called radio(s) 16*b* cannot use a time division working channel protocol but instead requires a frequency division working channel protocol, system 10 will always assign frequency division repeater 14 to allow these radios to communicate. If at least one of calling radio 16*a* and the called radio(s) 16*b* cannot use a frequency division working channel protocol but instead requires a time division working channel protocol, then system 10 will always assign time division repeater 18 to allows these radios to communicate. If radio 16*a* and the receiving radio(s) 16*b* are each "multi-mode" (i.e., they can use either frequency division or time division working channel protocols), system 10 can allow these two radios to communicate using either of repeaters 14, 18. Thus, system 10 is fully compatible with each of these different air interface types, and can work with radios 16 using any or all of these different air interfaces.

In a typical communication scenario, when a radio 16*a* makes a call request, that request indicates the radio and/or group identification numbers (IDs) involved in the call. A radio user selects a group on his radio by turning the knob or pushing a button. The user then pushes the radio's push-to-talk (PTT) button to begin transmitting. This causes the radio to send a communication request for a working channel over the inbound control channel.

The request includes an appropriate originating individual radio ID and radio group ID (or destination radio ID for radio to radio calls). The control channel repeater 12 (or equipment the control channel repeater connects to) maintains a database of individual radio and group identification numbers (ID's). The control channel repeater 12 (or a site controller computer connected to it) can use that database to look up a "mode indicator" corresponding to the radio group being assigned to a working channel.

The database tells the control channel repeater 12 whether the calling and called radios require a frequency division or a time division working channel, and may also specify a default mode in the case of radios that can use any of two or more different modes. The control channel repeater 12 determines which type of base station repeater to assign to the call by accessing the capabilities of the source and destination radios and/or radio groups to be involved in the call which are also stored in the database for each radio and group.

The control channel repeater 12 indicates its assignment by sending the assigned channel number out over the outbound control channel. Each radio maintains a copy of a site ID channel map specifying which channels are frequency division and which channels are time division. Called and calling radios 16 can switch to the appropriate air interface protocol based on this information.

Adaptive Vocoder Selection

Figure 5A:
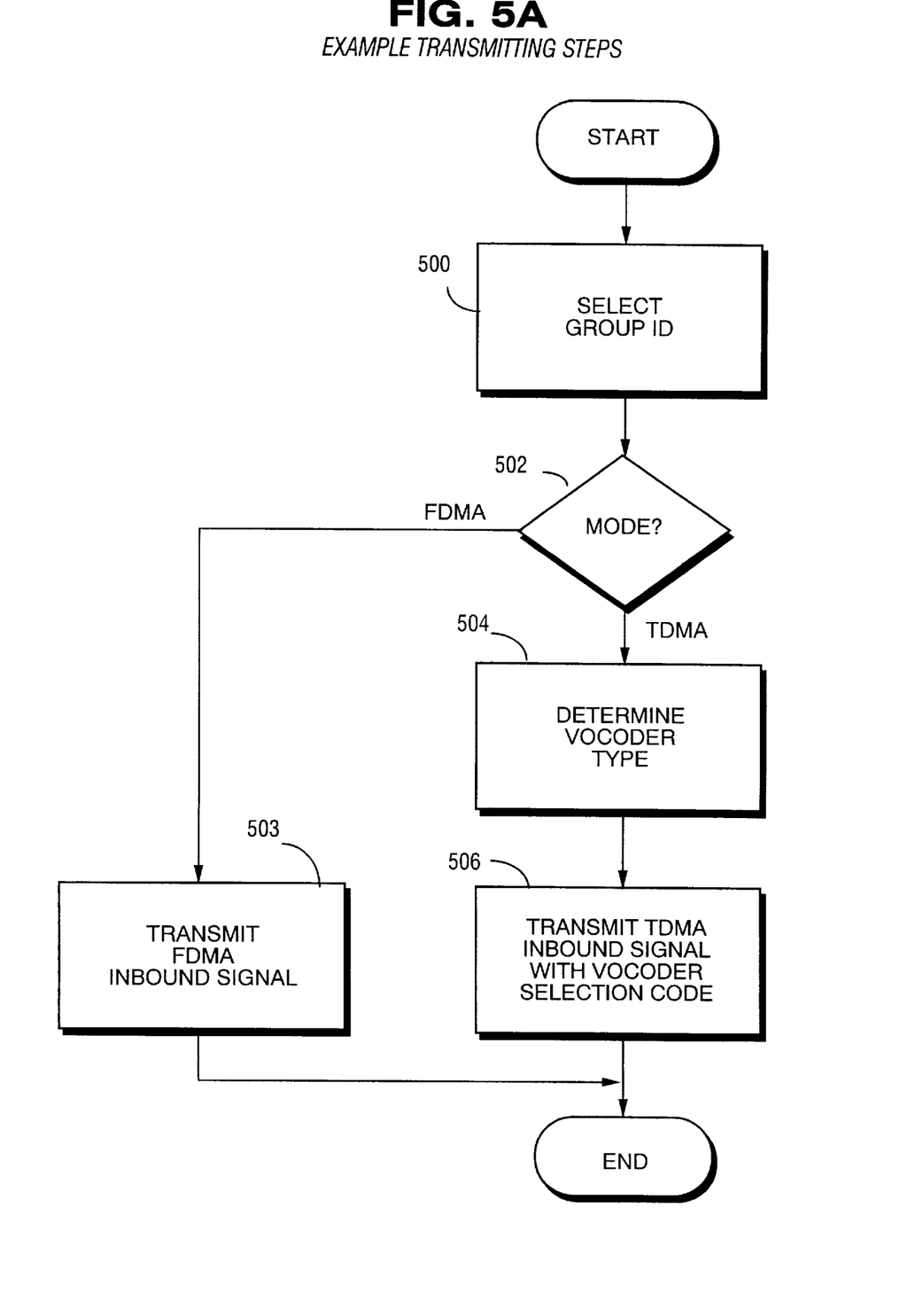
FIGS. 5A and 5B show example transmitting and receiving processes
Figure 5B:
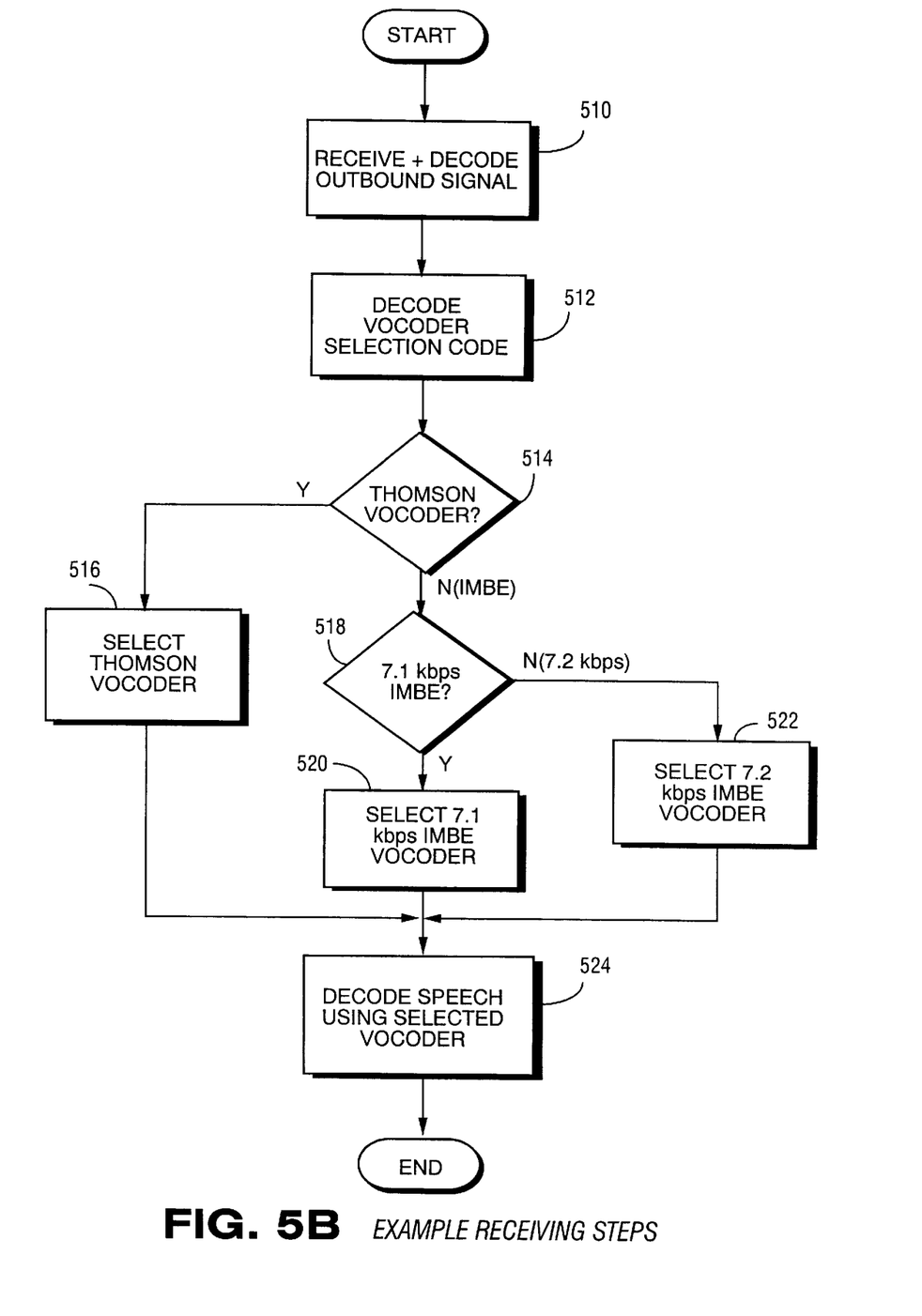

As mentioned above, in the preferred embodiment, transmitting radios can specify one of several different speech vocoding types in the signals they send over the assigned time division working channel, and receiving radios can adapt to this vocoder type specification by selecting appropriate speech vocoding circuits and/or algorithms for use in decoding the incoming vocoded speech signals. FIGS. 5A and 5B show example adaptive vocoder selection processes for transmit and receive, respectively. Referring to FIG. 5A, a transmitting radio may select group ID (block 500), and may then determine protocol type (e.g., frequency division or time division) based on the processes described above (block 502). It may then begin operating on the assigned working channel using that protocol type (blocks 503, 506). If using time division working channel signaling, the radio may determine vocoder type (e.g., based on a particular vocoder type associated with group ID, the vocoder type the radio has available, etc.) (block 504). The radio may transmit working channel signaling including a 4-bit "vocoder type" field 408 (see FIGS. 3B–3C) that specifies the type of vocoder determined by step 504 (e.g., Thomson, 7.1 kbps IMBE, or 7.2 kbps IMBE) (block 506).

Meanwhile, a receiving radio(s) also assigned to the working channel may receive and decode the working channel signaling (FIG. 5B, block 510), and decode the vocoder selection code (408) transmitted by the transmitting radio (and/or the repeater in a SACCH field(s)) (block 512). If the code signifies a Thomson vocoder ("Y" exit to block 514), the radio can select Thomson vocoding circuitry and/or activate a Thomson vocoding algorithm (block 516). If the code signifies an IMBE vocoder ("NT" exit to block 514), the radio determines from the vocoder type code whether it should be using 7.1 kbps or 7.2 kbps IMBE vocoding (block 518), and selects and/or activates the appropriate corresponding circuitry and/or algorithm (blocks 520, 522). As explained above, use of 7.1 kbps IMBE vocoding in this example involves padding each IMBE frame with three extra bits so it has the same duration as a 7.2 kbps frame. The radio then begins using the selected vocoder circuitry and/or algorithm to decode vocoded speech signals (block 524) and may also inform the radio signaling protocol defining circuitry or other elements to accommodate the selected vocoder format.

While the invention has been described in connection with what is presently considered to be the most practical and preferred embodiments, the invention is not to be limited to the disclosed embodiments, but on the contrary, is intended to cover various modifications and equivalent arrangements included within the spirit and scope of the appended claims.

What is claimed is:

1. A method of communicating radio signals over the air comprising:

(a) transmitting a version of the TETRA time division signaling over a radio channel, said version of the TETRA time division signaling being scaled for transmission over a narrowband channel;

(b) accommodating any of plural vocoder frame formats within said transmitted signaling; and (c) synchronizing the transmitted signaling with a frequency division digital control channel, wherein the transmitting step (a) comprises transmitting a two-slot narrowbanded version of the TETRA signaling, said two-slot narrowbanded version including a two-slot frame structure and further including slow associated control channel bits grouped at the beginning of the two-slot frame structure to provide settling time required for full duplex two-slot TDMA communication.

2. A method as in claim 1 wherein the transmitting step (a) comprises transmitting the signaling substantially at the data rate of 18 kbps to 19.2 kbps.

3. A method as in claim 1 wherein the transmitting step (a) comprises transmitting the signaling over a channel having a maximum bandwidth of substantially 12.5 kHz.

4. A method as in claim 1 wherein the accommodating step (b) includes accommodating at least one IMBE vocoder frame format.

5. A method as in claim 1 wherein the synchronizing step (c) comprises synchronizing the transmitted signaling with a frequency division digital control channel transmitted substantially at 9.6 kbps.

6. A method as in claim 1 wherein the transmitting step (a) includes transmitting a sequence of scaled, narrowbanded TETRA time division digital slots that are periodically synchronized with the digital control channel downlink signaling.

7. A method as in claim 1 wherein transmitting step (a) includes transmitting first and second blocks of digitized speech within the slot/frame, each digitized speech block comprising one-and-a-half vocoder speech frames.

8. A method as in claim 7 wherein each of the first and second blocks comprises 216 bits.

9. A method as in claim 8 further including accommodating smaller vocoder speech frames by padding at least some of the 216 bits within each digitized speech block.

10. A method as in claim 1 wherein transmitting step (a) includes transmitting three IMBE vocoder frames within each time division multiplexed slot.

11. A method as in claim 1 wherein transmitting step (a) includes transmitting a 510-bit slot substantially at 19.2 kbps, and appending plural pad bits at the end of the slot.

12. A method as in claim 11 wherein the appending step includes appending 34 pad bits to the end of the 510-bit slot.

13. A method as in claim 1 wherein the transmitting step includes transmitting:
 (i) a power control field, then
 (ii) a tail field, then
 (iii) a first digitized speech block, then
 (iv) a sync field, then
 (v) a second digitized speech block, then
 (vi) a tail field, and then
 (vii) a guard field.

14. A method as in claim 1 wherein the transmitting step includes transmitting:
 (i) a 30 to 34 bit power control field, then
 (ii) a 4 bit tail field, then
 (iii) a 216 bit first digitized speech block, then
 (iv) a 22 bit sync field, then
 (v) a 216 bit second digitized speech block, then
 (vi) a 4 bit tail field, and then
 (vii) a 14 bit guard field.

15. A method of communicating radio signals over the air comprising:
 (a) transmitting a version of the TETRA time division signaling over a radio channel, said version of the TETRA time division signaling being scaled for transmission over a narrowband channel;
 (b) accommodating any of plural vocoder frame formats within said transmitted signaling; and
 (c) synchronizing the transmitted signaling with a frequency division digital control channel,
 wherein the transmitting step (a) includes transmitting a vocoder type field indicating which of the plural vocoder frame formats is in use.

16. A method of communicating radio signals over the air comprising:
 (a) transmitting a version of the TETRA time division signaling over a radio channel, said version of the TETRA time division signaling being scaled for transmission over a narrowband channel;
 (b) accommodating any of plural vocoder frame formats within said transmitted signaling; and
 (c) synchronizing the transmitted signaling with a frequency division digital control channel,
 wherein the transmitting step (a) includes transmitting a sequence of scaled, narrowbanded TETRA time division digital slots that are periodically synchronized with the digital control channel downlink signaling, and
 wherein the step of transmitting a sequence of slots/frames includes the step of aligning every ninth time division slot/frame with every seventeenth digital control channel frame.

17. A method of communicating radio signals over the air comprising:
 (a) transmitting a version of the TETRA time division signaling over a radio channel, said version of the TETRA time division signaling being scaled for transmission over a narrowband channel;
 (b) accommodating any of plural vocoder frame formats within said transmitted signaling; and
 (c) synchronizing the transmitted signaling with a frequency division digital control channel,
 wherein transmitting step (a) includes transmitting at least one vocoder type field within the slot/frame.

18. A method of operating a digital radio within a radio system having a frequency division control channel including an uplink and a downlink, the method comprising:
 (a) transmitting a channel request message on the frequency division control channel uplink;
 (b) receiving a channel assignment message over the frequency division control channel downlink, the received channel assignment message indicating an assigned time division working channel; and
 (c) at least in part in response to the received channel assignment message, transmitting at least one TETRA time division digital slot/frame scaled for narrowband transmission on the assigned time division working channel,
 wherein transmitting step (c) includes transmitting at least one vocoder type field within the slot/frame.

19. A method as in claim 18 wherein the transmitting step (c) includes transmitting a sequence of scaled, narrowbanded TETRA time division digital slots that are periodically synchronized with the digital control channel downlink signaling.

20. A method as in claim 19 wherein the step of transmitting a sequence of slots/frames includes the step of aligning every ninth time division slot/frame with every seventeenth digital control channel frame.

21. A method as in claim 18 wherein the assigned time division working channel has a maximum bandwidth of about 12.5 kHz, and transmitting step (c) comprises transmitting the digital slot/frame at a maximum data rate of between about 18 kbps and 19.2 kbps.

22. A method as in claim 18 wherein transmitting step (c) includes transmitting first and second blocks of digitized speech within the slot/frame,, each digitized speech block comprising one-and-a-half vocoder speech frames.

23. A method as in claim 22 wherein each of the first and second blocks comprises 216 bits.

24. A method as in claim 23 further including accommodating smaller vocoder speech frames by padding at least some of the 216 bits within each digitized speech block.

25. A method as in claim 18 wherein transmitting step (c) includes transmitting three IMBE vocoder frames within the slot.

26. A method as in claim 18 wherein transmitting step (c) includes transmitting a 510-bit slot substantially at 19.2 kbps, and appending plural pad bits at the end of the slot.

27. A method as in claim 26 wherein the appending step includes appending 34 pad bits to the end of the 510-bit slot.

28. A method as in claim 18 wherein the transmitting step includes transmitting:

(i) a power control field, then (ii) a tail field, then (iii) a first digitized speech block, then (iv) a sync field, then (v) a second digitized speech block, then (vi) a tail field, and then (vii) a guard field.

29. A method as in claim 18 wherein the transmitting step includes transmitting:

(i) a 30 to 34 bit power control field, then (ii) a 4 bit tail field, then (iii) a 216 bit first digitized speech block, then (iv) a 22 bit sync field, then (v) a 216 bit second digitized speech block, then (vi) a 4 bit tail field, and then (vii) a 14 bit guard field.

30. A method as in claim 18 wherein said step (c) comprises transmitting a two-slot frame structure including slow associated control channel bits grouped at the beginning of the two-slot frame structure to provide settling time required for full duplex two-slot TDMA communication.

31. A method of operating a radio comprising:

(a) receiving a time division multiplexed signaling slot on an RF uplink, the slot including a vocoder type code indicating a vocoder type; and (b) encoding the vocoder type with slow associated control channel bits transmitted within time division multiplexed signaling over an RF downlink.

32. A method as in claim 31 wherein the encoding step (b) includes indicating whether the transmitted time division multiplexed signaling includes 7.1 kbps IMBE vocoded speech, 7.2 kbps IMBE vocoded speech, or 7.2 kbps Thomson vocoded speech.

33. A method of upgrading a frequency division radio system to provide a time division multiplexed working channel air interface, the method comprising:

(a) installing at least one repeater capable of transmitting and receiving a two-slot 12.5 kHz version of TETRA signaling scaled for transmission over a 12.5 KHz narrowband transmission channel; and (b) synchronizing the two-slot 12.5 kHz scaled version of TETRA signaling with frequency division control channel signaling.

34. A method as in claim 33 wherein the two-slot 12.5 kHz scaled narrowbanded version of TETRA signaling includes a two-slot frame structure including slow associated control channel bits grouped at the beginning of the two-slot frame structure to provide settling time required for full duplex two-slot TDMA communication.

35. In a method of communicating a digital time division signaling slot over a radio channel comprising:

(a) transmitting a power amplifier ramp field;

(b) transmitting tail bits;

(c) transmitting a first vocoded speech block;

(d) transmitting a sync field;

(e) transmitting a second vocoded speech block;

(f) transmitting additional tail bits; and (g) transmitting guard bits, an improvement comprising:

(i) transmitting vocoder type information within the slot, and (ii) using the vocoder type information to select between first and second differing vocoder formats for said vocoded speech block.

36. A method of transmitting a digital time division signaling slot over a radio channel comprising:

(a) transmitting a power amplifier ramp field, then (b) transmitting a vocoder type field, then (c) transmitting tail bits, then (d) transmitting a first vocoded speech block, then (e) transmitting a sync field, then (f) transmitting a second vocoded speech block, then (g) transmitting additional tail bits; and then (h) transmitting guard bits.

37. A method of upgrading an existing frequency division multiplexed trunked radio communication system to accommodate time division multiplexed digital communications while preserving compatibility with existing radios incapable of transmitting or receiving time division multiplexed digital communications, the method including:

installing, within the system, at least one new repeater capable of transmitting a two-slot time division multiplexed version of TETRA digital signaling scaled for narrowband transmission within a 12.5 kHz channel bandwidth; and selectively assigning the new repeater to handle radio calls substantially without assigning the new repeater to handle calls for radios incapable of transmitting or receiving the scaled TETRA time division multiplexed digital communications.

38. A method as in claim 37 wherein the two-slot time division multiplexed scaled version of TETRA digital signaling includes a two-slot frame structure including slow associated control channel bits grouped at the beginning of the two-slot frame structure to provide settling time required for full duplex two-slot TDMA communication.

39. A method of upgrading an existing frequency division multiplexed trunked radio communication system to accommodate time division multiplexed digital communications while preserving compatibility with existing radios incapable of transmitting or receiving time division multiplexed digital communications, the system including at least one existing frequency division working channel repeater, the method including:

installing, within the system, at least one new repeater capable of transmitting a two-slot time division multiplexed version of TETRA digital signaling scaled for narrowband transmission within a 12.5 kHz channel bandwidth;

selectively assigning the new repeater to handle radio calls for radios capable of transmitting or receiving time division multiplexed scaled narrowbanded version of TETRA digital communications; and selectively assigning the existing repeater to handle radio calls for radios not capable of transmitting or receiving time division multiplexed scaled narrowbanded TETRA digital communications.

40. A method as in claim 39 further including the step of adapting the new repeater during operation to either of two different, predefined vocoded speech formats.

41. A method as in claim 39 wherein the system includes a frequency division control channel repeater, and the method further includes synchronizing transmissions of the new repeater with transmissions of the control channel repeater.

42. A method as in claim 41 wherein the synchronizing step includes aligning a time division frame edge transmitted by the new repeater with a control channel frame edge transmitted by the control channel repeater once substantially every 510 ms.

43. A method as in claim 39 wherein the two-slot time division multiplexed scaled version of TETRA digital signaling includes a two-slot frame structure including slow associated control channel bits grouped at the beginning of the two-slot frame structure to provide settling time required for full duplex two-slot TDMA communication.

44. In a radio communications system using a two-slot time division multiplexed frame structure, an improvement comprising grouping slow associated control channel (SAACH) bits and positioning them before an initial sync field at the beginning of the two-slot frame structure to provide settling time required for full duplex two-slot TDMA 12.5 kHz communication.

* * * * *